United States Patent [19]

Brauers

[11] Patent Number: 4,799,694
[45] Date of Patent: Jan. 24, 1989

[54] PISTON RING AND METHOD OF MAKING THE SAME

[75] Inventor: Bert Brauers, Burscheid, Fed. Rep. of Germany

[73] Assignee: Goetze AG, Burscheid, Fed. Rep. of Germany

[21] Appl. No.: 135,522

[22] Filed: Dec. 17, 1987

[30] Foreign Application Priority Data

Dec. 18, 1986 [DE] Fed. Rep. of Germany ....... 3643243

[51] Int. Cl.$^4$ .......................... F16J 9/20; B23P 15/06
[52] U.S. Cl. .................................. 277/140; 29/156.6; 267/1.5
[58] Field of Search .................. 277/139, 140, 149; 267/1.5; 29/156.6, 557, 558; 83/405; 72/335, 338, 405

[56] References Cited

U.S. PATENT DOCUMENTS

| | | | |
|---|---|---|---|
| 2,111,258 | 3/1938 | Zahodiakin | 267/1.5 |
| 2,697,865 | 12/1954 | Norton | 29/156.6 X |
| 2,834,096 | 5/1958 | Norton | 29/156.6 |
| 2,837,385 | 6/1958 | Mayfield | 277/140 |
| 3,181,875 | 5/1965 | Shepard | 277/140 |
| 3,477,732 | 11/1969 | Warrick | 267/1.5 X |
| 3,633,260 | 1/1972 | Warrick | 29/156.6 |
| 3,701,275 | 10/1972 | Overway et al. | 29/156.6 X |

FOREIGN PATENT DOCUMENTS 3530175 6/1986 Fed. Rep. of Germany .

OTHER PUBLICATIONS

Spur et al, "Umformen und Zerteilen" (Reshaping and Severing), Handbuch der Fertigungstechnik (Handbook of the Manufacturing Technology), vols. 2/3, 1985, pp. 1290–1293, 1384–1385.

Primary Examiner—Robert S. Ward
Attorney, Agent, or Firm—Spencer & Frank

[57] ABSTRACT

A piston ring assembly has an expander spring of sheet material bent into an annular configuration. The expander spring has a circumferential series of radially oriented tongues and each tongue has an approximately axially bent leg. The tongues and legs are defined by stamped-out slots provided in the expander spring in an alternatingly radially inwardly and radially outwardly oriented circumferential series. The expander spring has stamping burrs bounding the slots. The piston ring assembly further has two laminar oil scraper rings arranged generally concentrically with respect to the expander spring. The laminar oil scraper rings are axially supported by the tongues and are radially supported by the legs. The burrs are situated such that they are submitted solely to compression forces derived from bending stresses generated as a result of bending the spring into the annular configuration.

2 Claims, 1 Drawing Sheet

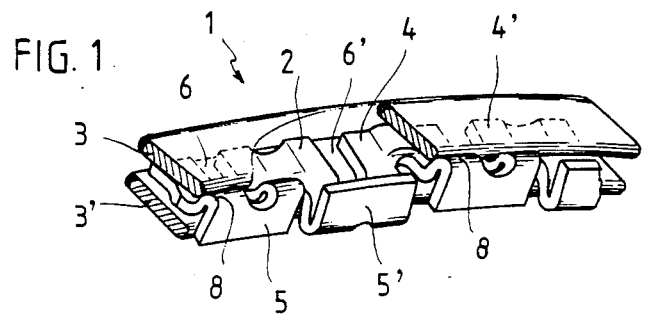
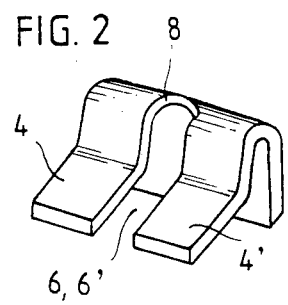
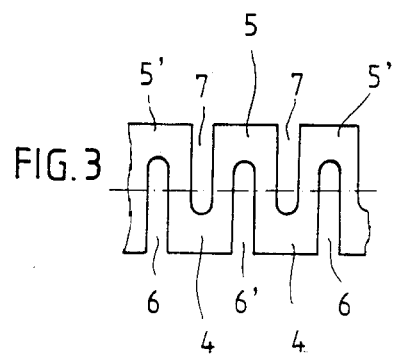
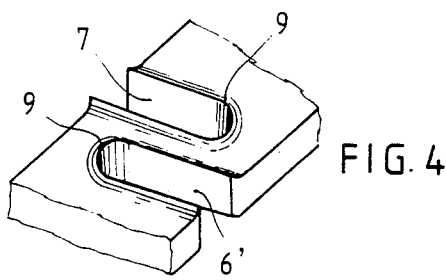
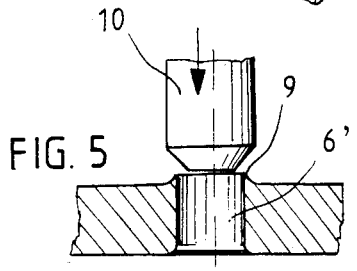
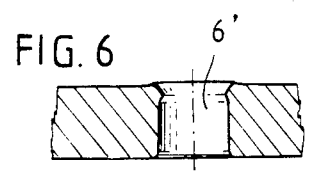

PISTON RING AND METHOD OF MAKING THE SAME

BACKGROUND OF THE INVENTION

This invention relates to a piston ring, particularly an oil scraper piston ring of axially small height formed of an expander spring made of sheet material and two laminar rings which, on the one hand, are axially supported on a plurality of circumferentially arranged, radially extending tongues of the expander spring and, on the other hand, are radially supported by legs which are approximately axially bent from the tongues of the expander spring. The legs have radially inwardly oriented extensions. The tongues and leg of the expander spring are formed by a circumferential series of slots cut into the expander spring alternatingly from the radially inner and radially outer edge thereof.

It is generally known to provide oil scraper rings having a multi-part steel ring construction, wherein for radially pressing at least one laminar ring against the cylinder wall, there is provided an expander spring made of sheet material. The expander spring is slotted in such a manner that a highly flexible construction is obtained which may be bent into a ring of defined cross-sectional configuration to provide a suitable solution for the selected engine.

Conventionally, the slots are provided by stamping the sheet material in a given single direction. U.S. Pat. No. 3,633,260 discloses an expander spring ring made with such a process. If such a stamped-out strip is bent into its permanent shape, for example, a shape wherein a bending angle of approximately 180° is required, as disclosed, for example, in German Patent No. 3,530,175, fissures appear in the ring, in the zones of tension derived from the bending stresses to which the strip material is exposed. Such fissures, whose appearance is caused to a great measure by the burrs resulting from the stamping operation, start from the cut edge of the expander spring. The stamped cross section is composed, as viewed in the direction of stamping, of approximately ⅔ of a smooth cutting face and ⅓ of tensioned (fissured) face. This ratio is dependent from a great number of parameters, such as the type of the sheet material and the sharpness (state of wear) of the cutting tool. At the end of the tension-stressed surface stamping burrs appear which, during the subsequent bending of the metal strip cause fissures at those locations. The fissures adversely affect the service life of the expander spring and thus also shorten the service life of the engine served by the piston rings.

SUMMARY OF THE INVENTION

It is an object of the invention to provide a piston ring of the above-outlined type whose service life is lengthened without adversely affecting operational safety or economy.

This object and others to become apparent as the specification progresses, are accomplished by the invention, according to which, briefly stated, the position of the stamping burr of the slots provided in the expander spring blank is so selected that in the bent state of the metal strip the stamping burr is exposed to compression stresses. In the alternative, the stamping burr of the slots is, at least in the zone of the locations exposed to tension stresses in the bent condition, substantially removed by embossing.

In an expander spring according to the invention as outlined above, after bending in the predetermined crosssectional profile no fissures appear in the edge zones of the cuts exposed to tension forces, whereby the service life of the expander springs is significantly increased. For an economic manufacture of such expander springs it has been found that the slots which define the legs of the expander spring are provided in each instance in one direction and the slots defining the tongues are provided alternatingly in opposite directions and subsequently, the stamping burr is removed by embossing in a direction which is opposite to the respective stamping direction.

BRIEF DESCRIPTION OF THE DRAWING

FIG. 1 is a perspective view of an oil scraper piston ring assembly incorporating the invention.

FIG. 2 is a perspective view of an enlarged detail of a component of the piston ring assembly shown in FIG. 1.

FIG. 3 is a partial developed view (stamped blank) of the expander spring of the piston ring assembly of FIG. 1.

FIG. 4 is a fragmentary perspective view of the expander spring showing the position of the stamping burrs.

FIG. 5 is a sectional side elevational view illustrating an embossing process.

FIG. 6 is a fragmentary cross-sectional view of an expander spring illustrating a slot subsequent to an embossing process.

DESCRIPTION OF THE PREFERRED EMBODIMENT

Turning to FIG. 1, there is illustrated therein a three-part piston ring assembly 1 formed of an expander spring 2 made of a strip material and two laminar oil scraper rings 3, 3' which are axially supported by radially extending tongues 4 and radially supported by legs 5, 5' bent axially from the tongues 4. The legs 5, 5' are bent alternatingly in opposite directions, as viewed circumferentially.

FIG. 2 shows a segment of the expander spring 2. The tongues needed for the axial support of the laminar rings 3, 3' are defined by slots 6, 6'.

The stamped-out spring blank from which the expander spring 2 is formed is illustrated in FIG. 3. Straight slots 6, 6' and 7 with semicircular terminus extend alternatingly in the direction towards the outer spring edge whereby the legs 5, 5' are defined by the slots 7. According to the invention, the slots 7 are stamped from the same direction, for example, from above downwardly while the slots 6, 6' are alternatingly stamped from opposite directions such that the stamping burr in the zone 8 of the slots 6, 6' is, in the bent state of the expander spring, exposed to compressive forces.

In FIG. 4 the position of the stamping burrs 9 is shown in the zone of the slots 6' and 7. The stamping burrs 9 are removed by means of an embossing punch 10, as shown in FIG. 5. Subsequent to the embossing operation, the slots are smoothened (FIG. 6) and are thus prevented from tearing during the subsequent bending operation. Because of the large number of expander spring constructions it may be required for certain spring blanks to combine the feature of stamping from opposite directions with the embossing operation. If, for example, the stamping burr 9 of the slots 6, 6' is at all times on that side of the strip material which is exposed to compressing forces, this zone of the slots need not be smoothened by the embossing step.

It will be understood that the above description of the present invention is susceptible to various modifications, changes and adaptations, and the same are intended to be comprehended within the meaning and range of equivalents of the appended claims.

What is claimed is:

1. In a piston ring assembly having an expander spring of sheet material bent into an annular configuration, said expander spring having a circumferential series of radially oriented tongues; each tongue having an approximately axially bent leg; said tongues and legs being defined by stamped-out slots provided in said expander spring in an alternatingly radially inwardly and radially outwardly oriented circumferential series; said expander spring having stamping burrs bounding said slots; said piston ring assembly further having two laminar oil scraper rings arranged generally concentrically with respect to said expander spring; said laminar oil scraper rings being axially supported by said tongues and being radially supported by said legs; the improvement wherein said burrs are situated such that they are submitted solely to compression forces derived from bending stresses generated as a result of bending the spring into the annular configuration.

2. In a method of making an annular expander spring forming part of a piston ring assembly; said expander spring having a circumferential series of radially oriented tongues; each tongue having an approximately axially bent leg said tongues and legs being defined by stamped-out slots provided in said expander spring in an alternatingly radially inwardly and radially outwardly oriented circumferential series; said expander spring having stamping burrs bounding said slots; said piston ring assembly further having two laminar oil scraper rings arranged generally concentrically with respect to said expander spring; said laminar oil scraper rings being axially supported by said tongues and being radially supported by said legs; the method including the step of stamping slots into a strip-shaped blank of the expander spring in an alternating series along opposite longitudinal edges of said strip by a stamping tool in a stamping direction being perpendicular to the plane in which the blank lies; the improvement wherein the step of stamping comprises the step of stamping out, from the same stamping direction, the slot defining the legs and stamping out, from alternating stamping directions, the slots defining the tongues; further comprising the step of removing the burrs by embossing the blank in a direction opposite to the respective stamping direction.

* * * * *